United States Patent
Tonohara

(10) Patent No.: US 8,357,321 B2
(45) Date of Patent: Jan. 22, 2013

(54) PRODUCING METHOD OF POLYMER FILM

(75) Inventor: Kouji Tonohara, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 439 days.

(21) Appl. No.: 12/067,597

(22) PCT Filed: Sep. 20, 2006

(86) PCT No.: PCT/JP2006/319092
§ 371 (c)(1),
(2), (4) Date: Mar. 20, 2008

(87) PCT Pub. No.: WO2007/034973
PCT Pub. Date: Mar. 29, 2007

(65) Prior Publication Data
US 2009/0273104 A1    Nov. 5, 2009

(30) Foreign Application Priority Data
Sep. 21, 2005  (JP) .................................. 2005-273539

(51) Int. Cl.
*B29C 49/08* (2006.01)
*B29C 55/00* (2006.01)

(52) U.S. Cl. ............... 264/210.7; 264/210.1; 264/288.4; 264/290.2; 264/291

(58) Field of Classification Search .................. 264/210, 264/210.1, 210.7, 288.4, 290.2, 291, 289.6
See application file for complete search history.

(56) References Cited

U.S. PATENT DOCUMENTS

| | | | |
|---|---|---|---|
| 4,330,499 A * | 5/1982 | von und zu Aufsess et al. ........................ | 264/289.6 |
| 6,096,375 A * | 8/2000 | Ouderkirk et al. .......... | 427/163.1 |
| 6,939,499 B2 * | 9/2005 | Merrill et al. ............... | 264/288.4 |
| 2003/0020208 A1 * | 1/2003 | Tasaka et al. ................. | 264/217 |
| 2003/0155558 A1 * | 8/2003 | Yamazaki ..................... | 252/585 |
| 2006/0216437 A1 * | 9/2006 | Murakami ..................... | 428/1.3 |

FOREIGN PATENT DOCUMENTS

| | | | |
|---|---|---|---|
| JP | 04152125 A | * | 5/1992 |
| JP | 2000-009934 A | | 1/2000 |
| JP | 2000-309051 A | | 11/2000 |

(Continued)

OTHER PUBLICATIONS

"Electronic Display Technology 2004", Jun. 2004, pp. 84-85, Kogyo Chosakai Publishing Co., Ltd.

(Continued)

*Primary Examiner* — Richard Crispino
*Assistant Examiner* — Elizabeth Royston
(74) *Attorney, Agent, or Firm* — Sughrue Mion, PLLC

(57) ABSTRACT

A casting dope (11) prepared from CAP, additive and solvent is cast onto a casting belt (35), peeled and dried to be a primary film (14), and wound to a primary film roll (16). After the storage, the primary film (14) is unwound and fed into a tenter device (18). In the tenter device (18), while the stretch in the widthwise direction is performed, a relaxation of the primary film (14) in the longitudinal direction is made. If an extent percentage of the stretch is less than 70% to the predetermined value, the relation is started. The primary film (14) is fed out as a produced polymer film (22) from the tenter device (18), and the polymer film (22) is wound up to a product film roll (24). On the produced polymer film (22), the in-plane retardation increases and the thickness retardation decreases. Thus the optical properties become preferable.

14 Claims, 6 Drawing Sheets

FOREIGN PATENT DOCUMENTS

| | | |
|---|---|---|
| JP | 2001-1745 | 3/2001 |
| JP | 2001-188128 | 7/2001 |
| JP | 2003-300248 A | 10/2003 |
| JP | 2003-329835 A | 11/2003 |
| JP | 2004-136613 A | 5/2004 |
| JP | 2004-195875 A | 7/2004 |

OTHER PUBLICATIONS

Notice of Submission of Opinion, dated Nov. 8, 2012, issued in corresponding KR Application No. 20087007006, 7 pages in English and Korean.

* cited by examiner

PRODUCING METHOD OF POLYMER FILM

TECHNICAL FIELD

The present invention relates to a producing method of a polymer film, and especially to a producing method of a polymer film to be used as an optical functional film.

BACKGROUND ART

A liquid crystal display (hereinafter LCD) is used in several products since it is light and thin and has the low power consumption. As the products, for example, in big size displays, there are a note book personal computer, a TV receiver with large screen and the like. Further, as the middle or small size product, there are a mobile phone, a personal digital assistant (PDA) and the like. Especially in recent years, the LCD is often used in the big type display.

In the LCD, a polymer film is used, since it is reasonable and excellent in flexibility. The polymer film is used as a protective film for a polarizing filter in the LCD and as a support of a retardation film for widening a view angle of the LCD. The film used in the LCD is called an optically functional film. Further, researchers develop rapidly the researches for a VA (vertically aligned) type and OCB (optically compensated bend) type that are produced by widening the view angle of a TN (twisted nematic) type. Also to these LCD of indication mode, a large number of the optically functional film is used. The optically functional film is produced by a solution casting method or a melt extrusion method the same as the polymer film for general use (for example, Electronic Display Technology 2004, Kogyo Chosakai Publishinig. Co., LTD., June, 2004).

In the solution casting method, a polymer such as a cellulose triacetate (hereinafter TAC) is dissolved to a mixture solvent whose main solvent is dichloromethane and methyl acetate, such that a polymer solution (hereinafter casting dope) may be obtained. The casting dope is cast from a casting die onto a support so as to form a casting film, while the discharged dope between the casting die and the support forms a bead. When the casting film has a self-supporting property, the casting film is peeled as a wet film, and the wet film is dried to be a film. Then the film is to be wound up. (cf: Japan Institute of Invention and Innovation (JIII) Journal of Technical Disclosure No. 2001-1745).

By the way, it is necessary for the optical functional film, especially the protective film of the polarizing filter to provide with not only high transparency and high strength but also high heat resistance. If the heat resistance of the protective film is not enough, the shrinkage and the deterioration of the protective film easily occurs under the high temperature and high humidity, and otherwise the deterioration and the like of the adhesive agent layer between the protective film and a glass plate of a liquid crystal cell. The shrinkage, the deterioration and the like causes the peeling of the protective film from the glass plate.

Therefore, there is a method in which other polymer is used than TAC in order to increase the moisture resistance and the heat resistance of the film to be produced by the solution casting method. For example, for the acylation of the cellulose, as described in Japanese Patent Laid Open Publication No. 2001-188128, the acylations are made by acetyl group (—CO—CH$_3$) and propionyl group (CO—C$_2$H$_5$), namely the esterification is made with acetic acid and propanoic acid, such that cellulose acylate propionate (hereinafter CAP) may be produced, and then the CAP is used as a raw material of the film.

The melt-extrusion method is performed as follows. For example, tips of polyethylene telephthalate (hereinafter PET) are produced from telephthalic acid and ethylene glycol. Then the PET tips are heated to melt, and the melt PET is extruded from an extruder onto a cooled drum as a support, so as to form a film. Note that other polyester films such as polyethylene naphthalate, cellulose film and the like are produced by the same method. Further, in the melt-extrusion method, in order to obtain the film of the objected optical properties, the stretch in a widthwise direction is made, and further the relaxation in a longitudinal direction is made. (cf: Japan Institute of Invention and Innovation (JIII) Journal of Technical Disclosure No. 2001-1745). If the stretch and the relaxation of the film are combined, the birefringency of the film becomes adjustable. The film having the birefringency is used as a retardation film of the LCD.

By performing the stretch in the widthwise direction and the relaxation in the longitudinal direction, the orientation of the polymer molecules is adjusted. Thus an in-plane retardation or a thickness retardation of the film is controlled. However, processes after the stretching process or the relaxation process cause the reorientation of the polymer molecules. Therefore, the film having the objected optical properties is hardly obtained.

High optical properties are required for the optically functional film to be used in the LCD of VA type for that a high speed response and a wide view angle are necessary. According to the LCD of the VA type, in order to realize the high speed response, a cell gap between glass plates for sandwiching liquid crystal molecules is made smaller. In this case, the in-plane retardation (Re) of the optical functional film becomes larger, and therefore there is a merit in view of an optical compensation. However, the thickness retardation (Rth) also becomes larger at the almost same ratio as the in-plane retardation (Re). Thus the thickness retardation is too large in comparison to the cell gap, which causes the worse optical properties of the LCD.

An object of the present invention is to provide a producing method of a polymer film in a batch process which has a predetermined optical properties.

Another object of the present invention is to provide a producing method of a polymer film in which an in-plane retardation is larger and a thickness retardation is lower than the prior art.

DISCLOSURE OF INVENTION

In order to achieve the object and the other object, in a producing method of a polymer film of the present invention, a stretching in a widthwise direction and a relaxation in a longitudinal direction of a film formed from a dope is made after the film is wound up. The dope contains polymer and solvent, and is cast from a casting die onto a support, so as to form a casting film. Then the casting film is peeled as a wet film from the support, and the wet film is dried to be a polymer film, which is wound up to a film roll. After the storage, the polymer film is unwound from the film roll. Then the stretching in the widthwise direction is made. During the stretching a relaxation of the polymer film in a longitudinal direction is performed.

Preferably, before a stretch ratio by the stretch becomes 70% of an objected value, the relaxation of the polymer film is started. Particularly preferably, a relaxation ratio of the polymer film by the relaxation is in the range of 1% to 5%.

Preferably a stretch ratio of the stretch is in the range of 10% to 40%.

Preferably the polymer is one of cellulose triacetate, cellulose acetate propionate and cellulose acetate butylate. Particularly preferably an in-plane retardation Re of the polymer film after the stretch is in the range of 5 nm to 150 nm, and a thickness retardation Rth in the range of 40 nm to 250 nm.

Preferably, the polymer film after the stretch is used for an optical functional film.

Further, in another embodiment of a producing method of a polymer film of the present invention, a molten polymer is extruded and cooled on a support and peeled as a polymer film, which is wound up to a film roll. After the storage, the polymer film is unwound from the film roll. Then the stretching in the widthwise direction is made. During the stretching a relaxation of the polymer film in a longitudinal direction is performed.

Preferably, before a stretch ratio by the stretch becomes 70% of an objected value, the relaxation of the polymer film is started. Particularly preferably, a relaxation ratio of the polymer film by the relaxation is in the range of 1% to 5%.

Preferably a stretch ratio of the stretch is in the range of 10% to 40%.

Preferably the polymer is one of cellulose triacetate, cellulose acetate propionate and cellulose acetate butylate. Particularly preferably an in-plane retardation Re of the polymer film after the stretch is in the range of 5 nm to 150 nm, and a thickness retardation Rth in the range of 40 nm to 250 nm.

Preferably, the polymer film after the stretch is used for an optical functional film.

According to the producing method of the polymer film of the present invention, the continuous polymer film whose main component is polymer is produced by one of the solution casting method and the melt extrusion method, and wound up to the film roll. Thereafter, the polymer film is unwound from the film roll and the stretch in the widthwise direction of the polymer film is made such that the polymer film may be obtained. During the stretch in the widthwise direction, the relaxation in the longitudinal direction of the polymer film is made. Therefore, the optical properties of the obtained polymer film can be made just before the shipment.

According to the producing method of the polymer film, when a difference of a film width during the stretch of the polymer film from that before the stretch is less than 70% of an objected value, the relaxation of the polymer film is started. Therefore the in-plane retardation Re is increased and the thickness retardation is decreased.

BEST MODE FOR CARRYING OUT THE INVENTION

Embodiments of the present invention will be explained in followings. At first, processes of a first embodiment of a method of producing a polymer film will be explained, while in the first embodiment a solution casting method is performed. Note that processes of a second embodiment in which a melt-extrusion method is performed will be explained later.

In the first embodiment of the present invention, CAP is used as a polymer. However, the polymer to be used in the present invention is not restricted in CAP, and may be any cellulose ester.

Figure 1:
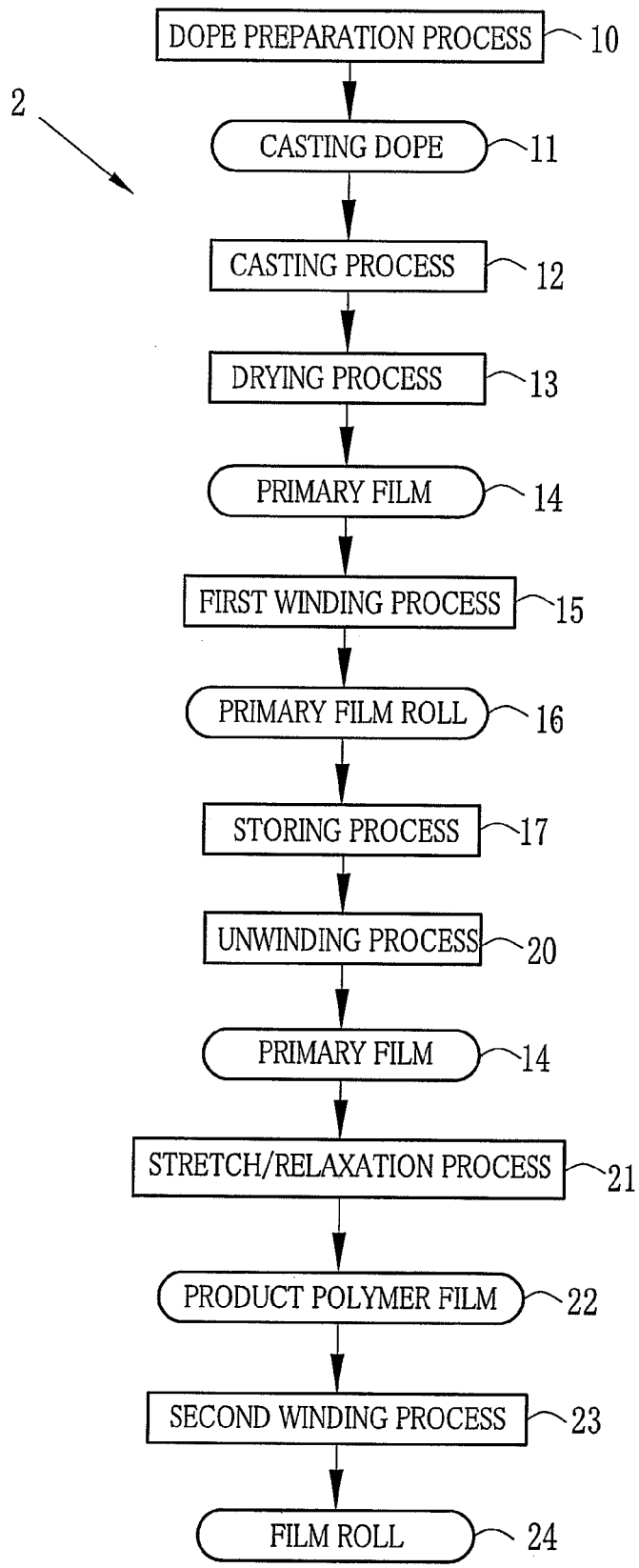
FIG. 1 is a flow chart of a first embodiment of a method of producing a polymer film of the present invention.

As shown in FIG. 1, a film production line 2 of the present invention to which the solution casting method is applied includes a dope preparation process 10, a casting process 12, a drying process 13, a first winding process 15, a storing process 17, a unwinding process 20, a stretch/relaxation process 21, and a second winding process 23.

In the present invention, the sort of polymer is not limited especially, so far as the film can be produced by the melt extrusion method or a solution casting method.

Figure 2:
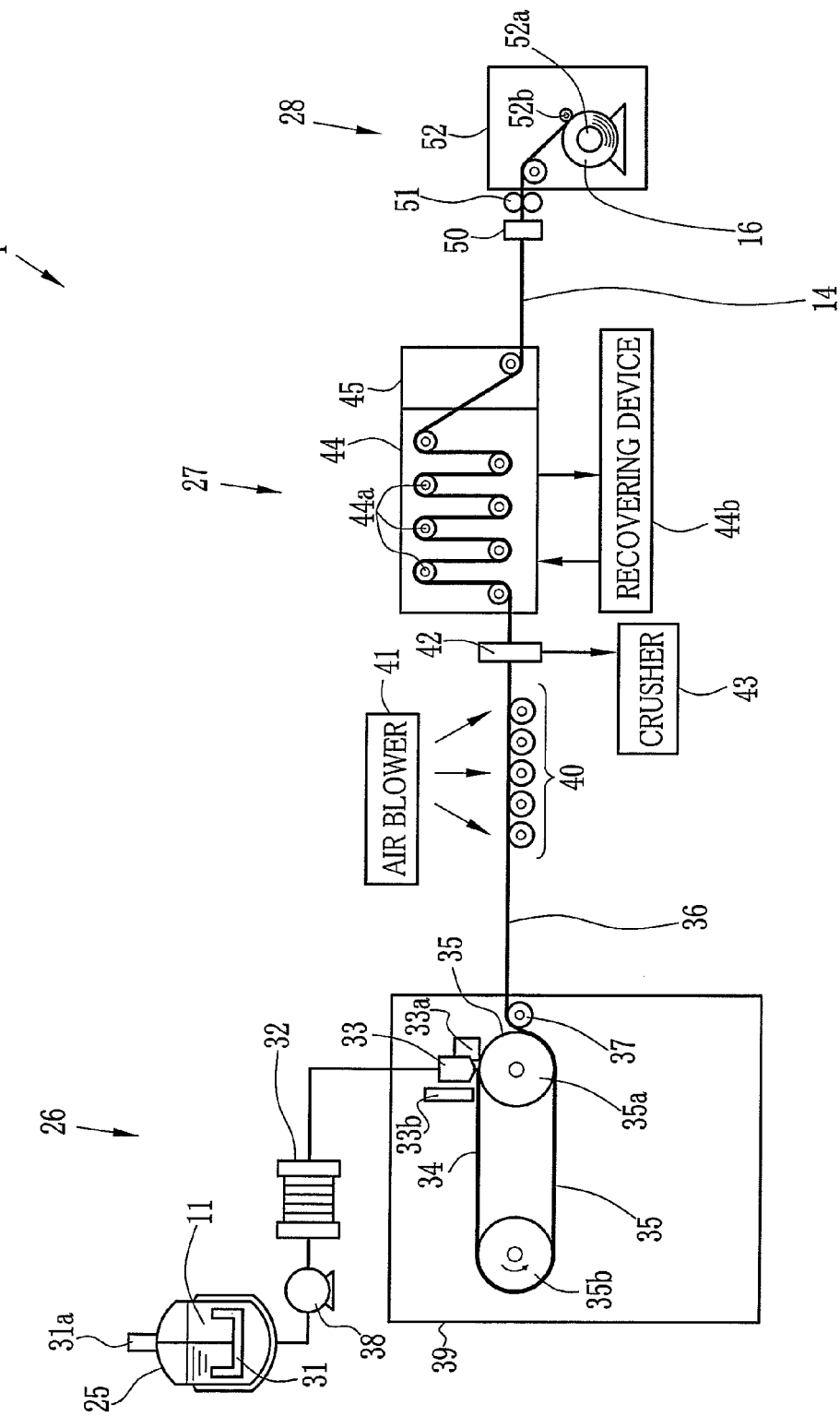
FIG. 2 is a schematic diagram of a dope production line for producing a casting dope to be used in the solution casting method of the present invention.

In the dope preparation process 10, a dope producing line (not shown) is used to prepare a casting dope 11 which is fed to a film production apparatus 4 (see, FIG. 2).

In the film production apparatus 4 are performed the casting process 12, the drying process 13, the first winding process 15 and the storing process 17. In the casting process 12, the casting dope 11 is cast onto a support to form a casting film 34 (see, FIG. 2), and the casting film 34 is peeled as a wet film 36 (see, FIG. 2). The wet film 36 is dried in the drying process 13, and then wound as a primary film 14 to a primary film roll 16 in the first winding process 15. Then in the storing process 17, the primary film roll 16 is stored in a predetermined position. Note that the solution casting method for producing the primary film 14 includes the dope preparation process 10, the casting process 12 and the drying process 13.

After the storing, the primary film roll 16 is set to a stretch/relaxation instrument 5 in which are performed the unwinding process 20, the stretch/relaxation process 21 and the second winding process 23. In the unwinding process 20, the primary film 14 is unwound from the primary film roll 16 to a tenter device 18 (see, FIG. 3) for performing the stretch/relaxation process 21. In the tenter device 18, a stretch or a relaxation of the primary film 14 in predetermined directions is made, and then the primary film 14 is fed out as a produced polymer film (hereinafter polymer film) 22 from the tenter device 18. The polymer film is wound up to a product film roll 24 in the second winding process 23.

[Dope Production Apparatus]

The dope production apparatus includes a solvent tank for storing a solvent, a hopper for supplying the CAP, an additive tank for storing an additive, and a mixing tank for mixing the solvent fed out from the solvent tank, and the CAP supplied from the hopper, and the additive fed out from the additive tank. Thus a mixture liquid is prepared in the mixing tank. Further, there are a heating device, a temperature controller and a filtration device. In the heating device, a mixture liquid fed out from the mixing tank is heated, and thus a dope is obtained. In the temperature controller, a temperature of the dope is controlled. In the filtration device, the filtration of the dope is made. In the downstream from the filtration device, there are a flush device for concentrating a dope by a flush concentration, and another filtration device for filtering the concentrated dope. Further, the dope production apparatus includes a recovering device for recovering a solvent vapor generated by the evaporation of the dope and a refining device for refining and recycling the recovered solvent.

[Film Production Line]

As shown in FIG. 2, the film production apparatus 4 includes a casting section 26 for performing the casting process 12, and a drying section 27 for performing the drying process 13, and a first film winding apparatus 28 for performing the first winding process 15.

[Casting Section]

The casting section 26 is provided with a stock tank 25 for storing the concentrated dope as the casting dope 11, a pump 38, a filtration device 32 connected to the stock tank 25, and a casting chamber 39. The stock tank 25 is provided therein with a stirrer rotated by a motor 31a. The pump 38 is driven to feed the casting dope 11 out from the stock tank 25 to the filtration device 32, and thus the filtration of the casting dope 11 is made by the filtration device 32. After the filtration, the casting dope 11 is fed to the casting chamber 39.

The casting chamber 39 includes a casting die 33 connected to the filtration device 32, a casting belt 35 as the support and a peel roller 37. The casting belt 35 is lapped by back-up rollers 35a, 35b, and endlessly or circulatory runs in accordance with rotation of the back-up rollers 35a, 35b. The casting die 33 casts the casting dope 11 onto the running casting belt 35 to form the casting film 34. When having a self-supporting property, the casting film 34 is peeled as a wet film 36 from the casting belt 35 by the peel roller 37. Note that the temperatures of the back-up rollers 35a, 35b are controlled to a predetermined value by a heat transfer medium circulator (not shown) for cycling a heat transfer medium through a feed path (not shown). Furthermore, it is to be noted that there are a decompression chamber 33a is attached to the casting die 33 in an upstream of the running direction of the casting belt 35 from the casting die 33. Further, in a downstream of the running direction from the casting die 33, there is an air shielding plate 33b. The explanations of the decompression chamber 33a and the air shielding plate 33b will be made later in detail.

[Drying Section]

The drying section 27 has a transfer area 40, an air blower 41, an edge slitting device 42, and a crusher 43. The air blower 41 blows a drying air to dry the wet film 36, and then both side edge portions of the wet film 36 is slit of by the edge slitting device 42. The slit portions are crushed by the crusher 43.

The drying section 27 includes a drying chamber 44 for drying the wet film 36 and a cooling chamber 45 for cooling the wet film 36 to a predetermined temperature. In the drying chamber, there are many rollers 44a on which the wet film 36 is overlapped and transported. Further, the drying chamber 44 has a recovering device 44b for adsorbing the solvent vapor generated in the drying chamber 44 so as to recover the solvent. After the cooling, the wet film 36 is fed out as the primary film 14 from the cooling chamber 45.

[Primary film Winding Section]

The first film winding apparatus 28 is provided with a compulsory neutralization device 50, a knurling roller 51, and a winding chamber 52. The compulsory neutralization device 50 eliminates the charged electrostatic potential of the primary film 14 to the predetermined value. Then the embossing of both side portions of the primary film 14 is made by the knurling roller 51 to provide the knurling. Thereafter the primary film 14 is fed to the winding chamber 52.

The winding chamber 52 is provided therein with a winding shaft 52a and a press roller 52b. The primary film 14 is wound up on the winding shaft 52 to the primary film roll 16. At this moment, a tension is applied at the predetermined value by the press roller 52b.

The obtained primary film roll 16 is stored such that the polymer molecules in the primary film 14 may not discomposed in effect of heat and moisture. Thus the optical property and the quality of the primary film 14 are kept.

[Stretch/Relaxation Apparatus]

Figure 3:
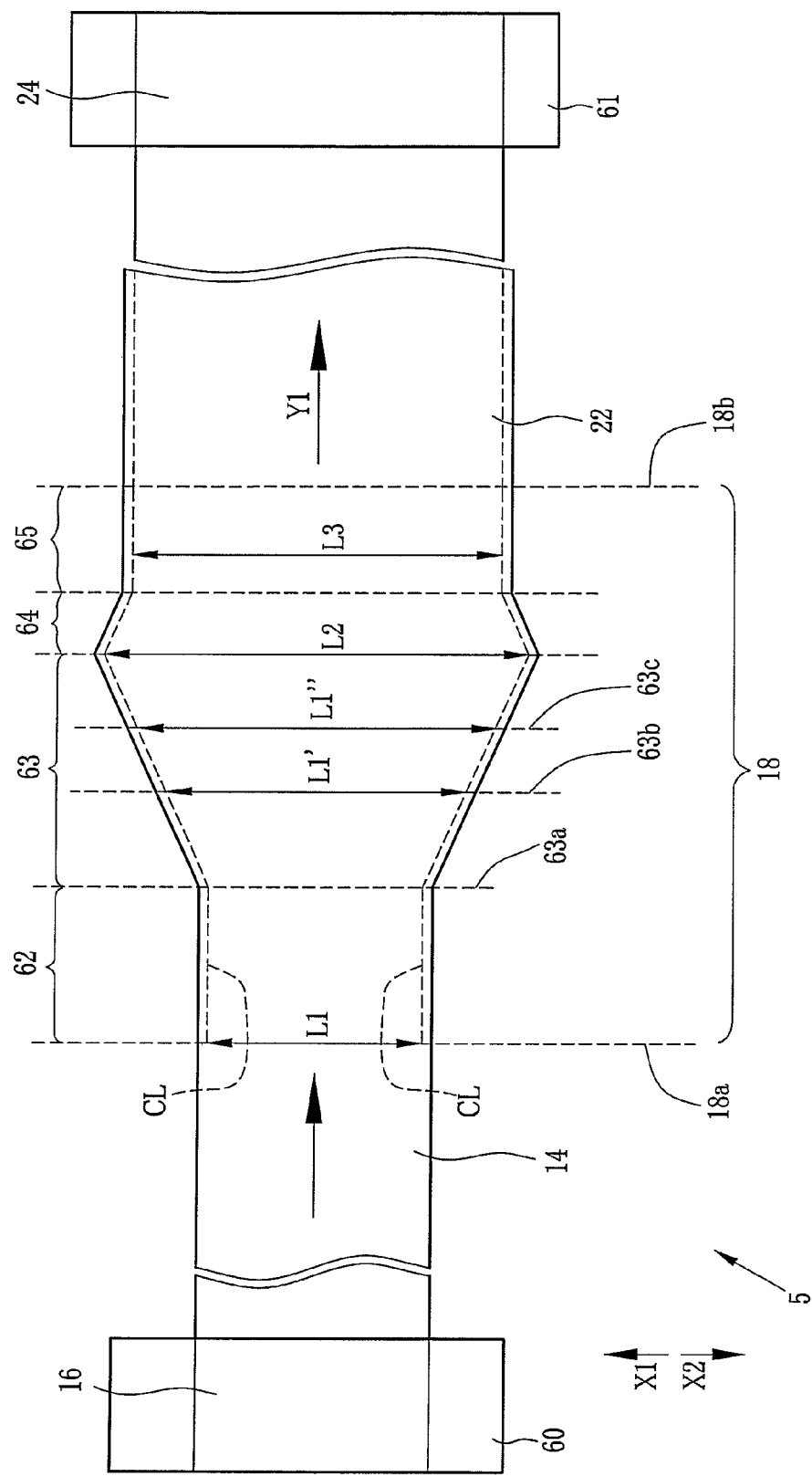
FIG. 3 is an explanatory view of a stretch and a relaxation in a tenter device.

As shown in FIG. 3, the stretch/relaxation apparatus 5 includes a film unwinding device 60, the tenter device 18, and a film winding device 61. The film unwinding device 60 unwinds the primary film 14 from the primary film roll 16. Then the stretch and the relaxation of the primary film 14 is made in the tenter device 14, and fed out as the primary film 14 from the tenter device 14. The produced polymer film 22 is wound up to the product film roll 24.

The tenter device 18 is constructed of an entrance section 62, a stretching section 63 in which the stretch of the primary film 14 in a widthwise direction X1, X2 is made, a relaxation section 64 in which the relaxation of the primary film 14 in the widthwise direction X1, X2 is made, and an exit section 65.

The tenter device 18 has many clips (not shown) connected to a chain (not shown). At an entrance 18a in the entrance section of the tenter device 18, both side edge portions of the primary film 14 are clipped by the clips. The positions of the clipping (hereinafter clipping position) CL are shown by dotted lines. Further, the clips are fixed to a chain in the transporting direction, and the chain endlessly runs by nipping with the sprocket. In accordance to the running of the chain, the clips move to transport the primary film 14 from the entrance section 62 through the stretching section 63 and the relaxation section 64 to the exit section.

A clipping portion of the slide type clip is provided with a member which can be lock to move in the longitudinal direction Y1 of the primary film 14 and unlocked to move oppositely to the longitudinal direction Y1. As the concretely type of the clip, there is a roller clip, an abacus bead clip, a belt clip and a drum-shaped roller. Therefore, the stretch in the widthwise direction X1, X2 and the relaxation in the longitudinal direction Y1 of the primary film 14 are made simultaneously in the stretching section 63.

The detail explanations of film production line 2 in FIG. 1 will be made in followings.

[Dope Preparation Process]

In the dope preparation process 10 (see, FIG. 1), the solvent is sent from the solvent tank to the mixing tank. Then the CAP in the hopper is supplied to the mixing tank with measurement of an amount of the CAP. Further, a necessary amount of the additive is fed from the additive tank to the mixing tank.

The mixing tank is provided with a jacket covering over an outer surface of the mixing tank, and a stirrer to be rotated by a motor. By rotating the stirrer, the mixing of the solvent, the CAP and the additive is made, and thus a mixture liquid in which the CAP is swollen in the solvent is obtained.

Then the mixture liquid is fed to the heating device, in which the mixture liquid is heated to a predetermined temperature in the range of 50° C. to 120° C. Preferably, a pressure is applied to the mixture liquid in the heating device. Thus the solid materials in the mixture liquid is dissolved under the heating condition or the heating and pressurizing condition, such that the dope may be obtained. The above method is called a heat-dissolution method in followings. Further, a cool-dissolution method may be applied to the present invention. In the cool-dissolution method, the mixture liquid is cooled in the range of −100° C. to −30° C. so as to perform the dissolution. In this embodiment, one of the heat-dissolution and cool-dissolution methods can be chosen in accordance with the properties of the materials, so as to control the solubility. Thus the dissolution of CAP to the solvent can be made enough. The dope is fed to the temperature controller so as to control the temperature nearly to the room temperature. Then the dope is fed to the filtration device, such that impurities may be trapped from the dope. Thereafter the dope is stocked as the casting dope 11 in the stock tank 25 in the film production apparatus 4.

Thus the produced casting dope 11 has the CAP concentration in the range of 5 mass % to 40 mass %. Note that the method of producing the dope is disclosed in detail in [0517] to [0616] in Japanese Patent Laid-Open Publication No. 2005-104148, for example, the dissolution method and the adding methods of the materials, the raw materials and the additives in the solution casting method for forming the CAP film, the filtering method, the bubble removing method, and the like.

[Casting Process]

In the casting process 12, the casting dope 11 in the stock tank 25 is stirred by rotation of the stirrer 31 to be uniform. At the stirring, the additive such as plasticizer, UV absorbing agent and the like may be added.

The uniform casing dope 11 is fed to the filtration device 32 by the pump 38 from the stock tank 25. After the filtration, the casting dope 11 is cast from the casting die 33 onto the casting belt 35 so as to form the casting film 34.

The casting film 34 is conveyed by running the casting belt 35. Further, an air outlet (now shown) is provided near the casting belt 35 and feeds out a drying air to evaporate the solvent from the casting film 34. Further, the air shielding plate 33a is vertically disposed in a downstream side of a running direction of the casting belt 35 from the casting die 33 and closed to the casting die 33, such that the lower end of the casting plate 33b is closed to the casting film 34 and the width of the air shielding plate 33b is parallel to the widthwise direction of the casting film 34. Thus the air shielding plate prevents the worse condition caused by blowing the drying air to the casting film 34 near the casting die 33.

The casting film 34 having the self-supporting property is peeled as the wet film 36 from the casting belt 35 by the peel roller 37.

[Drying Process]

In the drying process 13, the wet film 36 is transported through the transfer area 40 to the edge slitting device 42. In the transfer area 40, many rollers are provided and rotate in a predetermined direction so as to transport the wet film 36 to the edge slitting device 42. In the transfer area 40, the drying air having a predetermined temperature is fed out from the air blower 41, so as to dry the wet film 36.

Both side edge portions of the wet film 36 is slit off by the edge slitting device 42. The slit portions are sent to a crusher by a cutter blower (not shown), and crushed into tips by the crusher 43. The tips are reused for preparing the dope.

The wet dope after the edge slitting is sent to the drying chamber 44, and dried therein. The temperature in the drying chamber 44 is not restricted especially, and preferably in the range of 50° C. to 160° C. In the drying chamber 44, the primary film 14 is transported with lapping on the rollers 44a. The solvent vapor evaporated from the wet film 36 in the drying chamber 44 is adsorbed by the recovering device 44b. The air from which the solvent components are removed is reused for the drying air in the drying chamber 44. Then the wet film 36 is fed as the primary film to the cooling chamber 45, in which the primary film is cooled to a predetermined temperature.

[First Winding Process]

In the first winding process 15, the primary film 14 is wound around the winding shaft 52a and at this moment the tension is applied to the primary film 14 by the press roller 52b in the winding chamber 52. Thus the primary film roll 16 is obtained.

[Storing Process]

In the storing process 17, the primary film roll 16 is stored such that the polymer molecules of the primary film 14 may be not discomposed in effect of heat and moisture.

[Unwinding Process]

In the unwinding process 20, as shown in FIG. 3, an unwinding device 60 unwinds and the primary film 14 from the primary film roll 16 and continuously feeds the primary film 14 to the tenter device 18.

[Stretch/Relaxation Process]

The stretch/relaxation process 21 is performed in the tenter device 18, in which the predetermined conditions for the stretch in the widthwise direction X1, X2 and the relaxation in the longitudinal direction Y1 are set. Under these conditions, the stretch and the relaxation of the primary film 14 are made. Thus the polymer film 22 having a predetermined in-plane retardation (Re) and a thickness retardation (Rth) is obtained. Note that the explanation of the conditions for the stretch and the relaxation will be made later.

[Film Winding Process]

In the second winding process 23, the primary film 14 has predetermined optical properties, and is wound up around a winding shaft (not shown) to the product film roll 24.

Thus in the present invention, since the stretching in the widthwise direction and the relaxation in the longitudinal direction are performed, the optical properties are controlled. Therefore, the obtained polymer film 22 has the predetermined optical properties.

In followings, the stretch and the relaxation in the stretch/relaxation process 21 will be explained in detail.

At an entrance 18a in the entrance section of the tenter device 18, both side edge portions of the primary film 14 are clipped by clips (not shown). The clips are oppositely disposed in the widthwise direction so as to construct a clip pair (not shown). In this figure, L1 (mm) is a minimum of a distance of the clip pair in the entrance section 62. Note that L1 is a distance between the clipping positions CL of both sides of the wet film 47. Further, L1', L1", L2, L3 that will be explained below are also distances between the clipping positions CL of both sides of the wet film 47.

Further, the clips are fixed to a chain in the transporting direction, and the chain endlessly runs by nipping with the sprocket. In accordance to the running of the chain, the clips move to transport the primary film 14 from the entrance section 62 toward the stretching section 63. Note that the width of the primary film 14 is the same in the entrance section 62.

At a stretch starting position 63a in the stretching section 63, the stretch of the primary film 14 in the widthwise direction X1, X2 is started. While the stretch of the primary film 14 is made, the distance of the clip pair becomes larger from L1 (mm) to L2 (mm) which is determined as the maximum of the distance of the clip pair. Thereafter, in the relaxation section 64, the relaxation of the primary film 14 is made. Thus the distance of the clip pair becomes smaller from L2 (mm) to L3 (mm) which is named final value of the distance of the clip pair. Then in the exit section 65, the distance of the clip pair is kept to L3 (mm) and the primary film 14 is exit as the primary film 14 through an exit 18b from the tenter device 18. Note that the objected value in claim 2 is an objected stretch ration in the following description.

The relaxation in the longitudinal direction Y1 is made between a relaxation start position 63b and a relaxation end position 63c. The clips between the relaxation start position 63b and the relaxation end position 63c is shiftable oppositely to a transporting direction of the chain, such that the relaxation of the primary film 14 in the longitudinal direction may be made.

In the present invention, while the primary film 14 is stretched in the widthwise direction, the relaxation is made in the longitudinal direction. Thus the orientation of polymer molecules in the primary film 14 is controlled such that the in-plane retardation (Re) is increased. Further, since the thickness unevenness of the primary film 14 is smaller than in case of the normal stretch in the longitudinal direction, the thickness retardation (Rth) is decreased.

While the primary film 14 is stretched in the widthwise direction X1, X2, the relaxation is made in the longitudinal direction. The stretch is defined as the application of a tension in the stretching direction. Therefore, if the stretch is made in the widthwise direction the same as in the present invention, the width of the film sometimes becomes larger, sometimes does not change (namely the width is constant), and sometimes becomes smaller (namely the shrinkage of the film in the widthwise direction occurs). In the present invention, the relaxation is defined as the reduction of the stress remaining in the primary film 14. Concretely, the relaxation is to decrease the tension to be applied to the wet film in the widthwise direction X1, X2, to diminish the tension, to keep the temperature of the primary film 14 or the atmosphere around the primary film 14, and the like. Therefore, the relaxation is not limited especially, so far as the remaining stress in the primary film 14 can be reduced.

In the present invention, an objected stretch ratio R1 of the widthwise direction is defined as R1={(L2−L1)/L1}×100. The objected stretch ratio R1 is preferably in the range of 10% to 40%, particularly 15% to 35%, and especially 25% to 30%. If the objected stretch ratio R1 is less than 10%, the polymer molecules may be rearranged. In this case, the effect for increasing the in-plane retardation (Re) sometimes becomes smaller. Furthermore, the effect for remedy the defect (such as the wrinkles and creases and the like) which occurs by stretching sometimes becomes smaller. If the objected stretch ratio R1 is more than 40%, the rearrangement of the polymer molecules is excessively made, and therefore the in-plane retardation (Re) becomes too large. Furthermore, the defect sometimes occurs, for example the primary film 14 tears.

When the distance of the clip pair becomes a relaxation starting value L1', the relaxation in the longitudinal direction Y1 is started. The relaxation starting value L1' is previously calculated from a predetermined extent percentage EP1 (%) of the stretch in the widthwise direction X1, X2. The value EP (%) is defined as follows:

$$EP1=[(L1'-L1)/(L2-L1)]\times 100$$

Therefore, the relaxation starting value L1' is calculated from the following formula:

$$L1'=[(L2-L1)\times EP/100]+L1$$

In the present invention, the extent percentage EP1 is preferably less than 70%, particularly preferably in the range of 1% to 40%, and especially preferably in the range of 3% to 30%. For example, the minimum L1 (mm) of the distance of the clip pair is 1300 mm, the maximum value L2 (mm) is 1650 mm, and the final value L3 is 1620 mm. In this case the objected stretch ratio R1 is 26.92%. Preferably when the relaxation in the longitudinal direction starts, the relaxation starting value L1' is preferably in the range of 1300 mm (corresponding to 0% of the objected stretch ratio R1) to 1545 mm (corresponding to around 70% of the objected stretch ratio R1), particularly 1303.5 mm (corresponding to 1% of the objected stretch ratio R1) to 1440 mm (corresponding to around 40% of the objected stretch ratio R1), and especially 1310 mm (corresponding to 3% of the objected stretch ratio R1) to 1405 mm (corresponding to around 30% of the objected stretch ratio R1). Note that a stretch end point 101c is determined on the basis of a stretch start point 101b and a relaxation rate RL1 in the longitudinal direction Y1.

Figure 7:
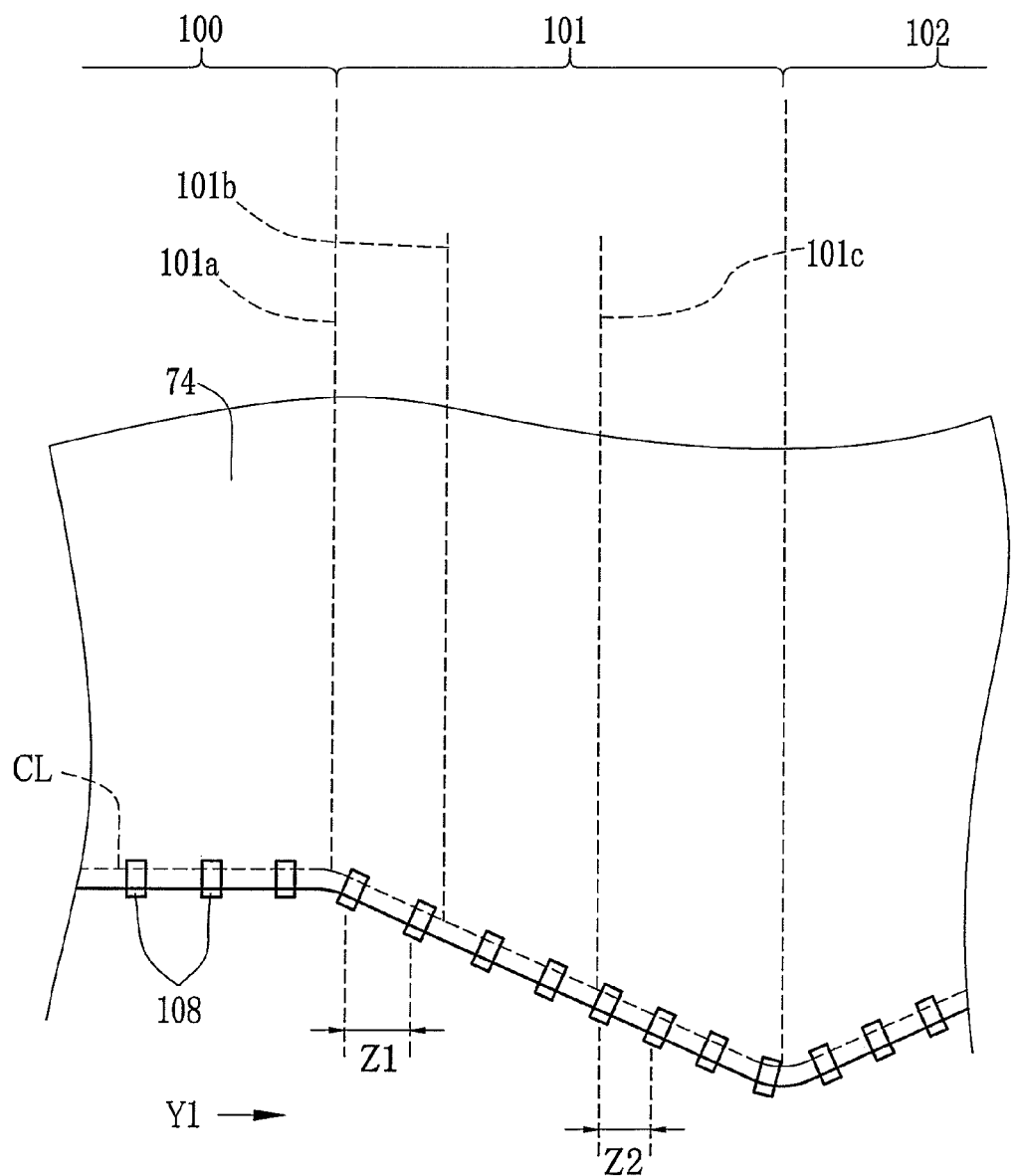
FIG. 7 is a main part of the tenter device used in the present invention.

As shown in FIG. 7, a relaxation ratio RL1 in the longitudinal direction Y1 is represented as $$RL1=\{(Z1-Z2)/Z1\}\times 100,$$

wherein Z1 is an element in the longitudinal direction Y1 of an interval between the neighboring clips 108 before the relaxation in the longitudinal direction Y1, and Z2 is an element in the longitudinal direction Y1 of an interval between the neighboring clips 108 after the relaxation in the longitudinal direction Y1. Note that Z1 and Z2 may not be defined as the elements in the longitudinal direction Y1 but the interval between the neighboring clips 108.

The relaxation ratio is not restricted especially. However, it is preferably in the range of 1% to 5%, particularly preferably 2% to 5%, and especially preferably 3% to 5%. If the relaxation ratio is less than 1%, the effect for decreasing the thickness retardation (Rth) is sometimes not enough. If the relaxation ratio is more than 5%, the slack of the primary film 14 sometimes occurs, which causes the troubles of production, such as transportation defects and the like.

The speed of the relaxation in the longitudinal direction, namely the change of the relaxation ratio RL1 in a unit time (one second) is preferably in the range of 0.0150%/sec to 2.000%/sec, particularly 0.050%/sec to 1.000%/sec.

In the present invention, while the primary film 14 is stretched in the widthwise direction X1, X2, the relasation in the longitudinal direction Y1 is performed. Thus the tension in the longitudinal direction Y1 that occurs during the stretch is reduced. Thus the orientation of polymer molecules in the primary film 14 is controlled such that the in-plane retardation (Re) is increased and the thickness retardation (Rth) is decreased.

As the tenter device 18 to be used in the present invention, there are several sorts other than the type in which the endless change is used to drive the clips. Namely, there are also linear motor type, pantograph type, and the like. The linear motor type is constructed of a carriage having a secondly winding and clips, guide rails for guiding the many carriage in predetermined directions, and a primary winding arranged near each guide rail. Further, since the largeness and the direction of the electric current flowing in the primary winding are controlled, each carriage on the guide rail can be moved at a predetermined speed. The pantograph type is constructed of clips, a guide rail, and a pantograph mechanism disposed between the lips and the guide rail. Since the pantograph mechanism is controlled, the distance between the clips in the longitudinal direction Y1 and the widthwise direction X1, X2 are adjusted. Therefore, the stretch and the relaxation of the primary film 14 in the widthwise direction X1, X2 and the longitudinal direction Y1 can be made even in use of the linear motor type or the pantograph type. The detailed explanation about the tenter devices of the linear motor type is made in Japanese Patent Laid Open Publication No. 2002-507501, H06-57618 and the like. The detailed explanation about the tenter devices of the pantograph type is made in Japanese Patent Laid Open Publication No. 2003-236927 and the like.

Further, the temperature in the tenter device 47 during the relaxation in the longitudinal direction is preferably 80° C. to 160° C., particularly 100° C. to 150° C. Herein, the content of remaining solvent on the dry basis is calculated from {(x−y)/ y)}×100, when the weight of the sampled film is x at the sampling and y after the drying of the sampled film.

Further, the relaxation start point 63b and the relaxation end point 63c may be plural, so as to make the relaxation in the longitudinal direction several times. In this case, the relaxation ratio RL1 may be a total of relaxation ratio RL1s of the relaxations performed several times, and otherwise, may be the relaxation ratio RL1 between the most upstream relaxation start point 63b and the most downstream relaxation end point 63c. Further, although the relaxation end point 63c is positioned in the stretching section 101 in FIG. 6, it may be also positioned in the relaxation section 102.

As described above, while the conditions for the stretch in the widthwise direction and the relaxation in the longitudinal direction of the primary film 14 is adequately set, the in-plane retardation (Re) and the thickness retardation (Rth) of the produced primary film 14 become predetermined values.

In followings, the raw materials for the primary film 14 (or primary film 14) will be explained.

[Raw Material]

The polymer used in the present invention is cellulose ester. As for cellulose ester, it is preferable to satisfy all of following formulae (I)-(II).

$$2.5 \leq A+B \leq 3.0 \tag{I}$$

$$1.25 \leq B \leq 3.0 \tag{II}$$

In these formulae (I)-(II), A is the degree of substitution of the acyl groups (—CO—R) for the hydrogen atoms on the hydroxyl groups of cellulose, and B is the degree of substitution of the propionyl group (—CO—$C_2H_5$), butyryl group (—CO—$C_3H_7$), pentanoyl group (—CO—$C_4H_9$) and hexanoyl group (—CO—$C_5H_{11}$) for the hydrogen atoms on the hydroxyl groups of cellulose. If B is propionyl group, the cellulose ester is called CAP (cellulose acetate propionate), and if B is butyryl group, the cellulose ester is called CAB (cellulose acetate butylate). Further, the formula (II) is preferably $1.3 \leq B \leq 2.97$, and especially preferably $1.4 \leq B \leq 2.97$. Preferably, at least 90 mass % of CAP and CAB is particles having a diameter in the range of 0.1 mm to 4 mm.

As solvent compounds for preparing the dope, there are aromatic hydrocarbons (for example, benzene, toluene and the like), hydrocarbon halides (for example, dichloromethane, chlorobenzene and the like), alcohols (for example, methanol, ethanol, n-propanol, n-butanol, diethyleneglycol and the like), ketones (for example, acetone, methylethyl ketone and the like), esters (for example, methyl acetate, ethyl acetate, propyl acetate and the like), ethers (for example, tetrahydrofuran, methylcellosolve and the like) and the like. It is to be noted in the present invention that the dope is a polymer solution or dispersion that is obtained by dissolving or dispersing the polymer in the solvent.

The solvent compounds are preferably hydrocarbon halides having 1 to 7 carbon atoms, and especially dichloromethane. Then in view of the solubility of CAP, the peelability of a casting film from a support, a mechanical strength of a film, optical properties of the film and the like, it is preferable that one or several sorts of alcohols having 1 to 5 carbon atoms is mixed with dichloromethane. Thereat the content of the alcohols to the entire solvent is preferably in the range of 2 mass % to 25 mass %, and particularly in the range of 5 mass % to 20 mass %. Concretely, there are methanol, ethanol, n-propanol, iso-propanol, n-butanol and the like. The preferable examples for the alcohols are methanol, ethanol, n-butanol, or a mixture thereof.

By the way, recently in order to reduce the effect to the environment to the minimum, the solvent composition when dichloromethane is not used is progressively considered. In order to achieve this object, ethers having 4 to 12 carbon atoms, ketones having 3 to 12 carbon atoms, esters having 3 to 12 carbon atoms, and alcohols having 1-12 carbon atoms are preferable, and a mixture thereof can be used. For example, as the mixture, there is a mixture of methyl acetate, acetone, ethanol and n-butanol. These ethers, ketones, esters and alcohols may have the ring structure. Further, the compounds having at least two of functional groups in ethers, ketones, esters and alcohols (namely, —O—, —CO—, -flow rate- and —OH) can be used for the solvent.

The detail explanation of cellulose acylate is made from [0140] to [0195] in Japanese Patent Laid-Open Publication No. 2005-104148. The description of this publication is also applied to the present invention. Further, there are for the additive several additive materials (such as the solvent, plasticizer, deterioration inhibitor, UV absorbing agent, optically anisotropic controller, retardation controller, dyne, matting agent, release agent, releasing accelerator and the like), which are described in detail from [0196] to [0516] of Japanese Patent Laid-Open Publication No. 2005-104148.

[Melt-Extrusion Method]

A second embodiment of the present invention will be described in followings. In the second embodiment, the CAP is used as the polymer to form the polymer film by the melt-extrusion method. However, in the present invention, the polymer to be used in the second embodiment is not restricted in the CAP, and other polymers may be used. As the other polymers, there are cellulose derivatives (such as cellulose acetate butylate (CAB) and the like), polyethylenes (polyethylene naphthalate (PEN) and the like) and polyamides (nylon and the like).

Figure 4:
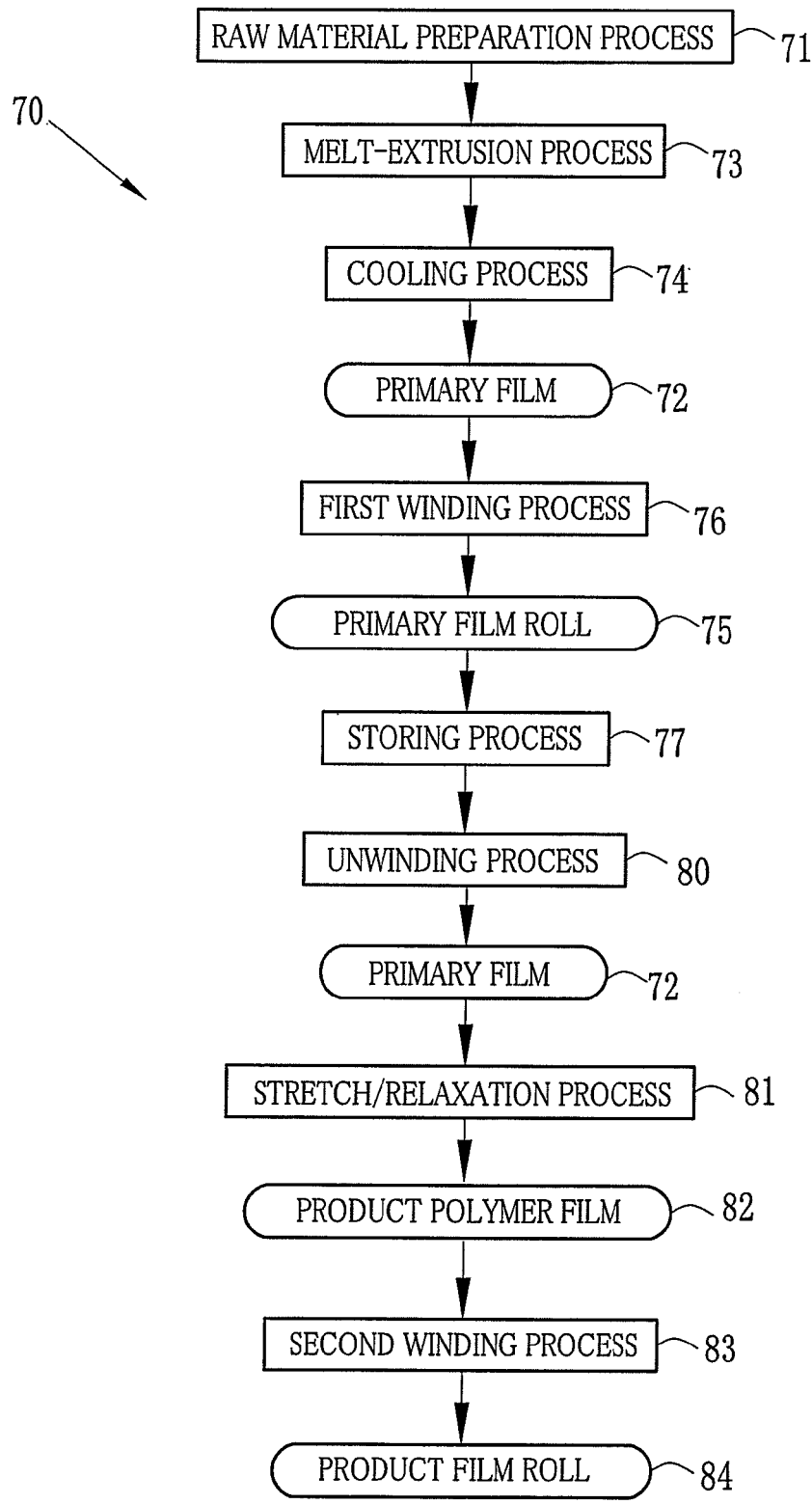
FIG. 4 is a flow chart of a second embodiment of a method of producing a polymer film of the present invention.

In FIG. 4, a film production line 70 of the present invention to which the melt-extrusion method is applied includes a raw material preparation process 71, an melt-extrusion process 73, a cooling process 74, a first winding process 76, a storing process 77, an unwinding process 80, a stretch/relaxation process 81, and a second winding process 83.

In the raw material preparation process 71, CAP tips as the polymer is produced as a raw material to be used in the film production line 70. The CAP tips are molten and the extrusion of the melt CAP onto a support is made in the melt-extrusion process 73, and the thin CAP film on the support is cooled to be a primary film 72 in the cooling process 74. The primary film 72 is wound up to a primary film roll 75 in the first winding process 76, and the primary film roll 75 is stored in a predetermined place in the storing process 77. In the unwinding process 80, the primary film 72 is unwound from the primary film roll 75 to the tenter device 18 (see, FIG. 3) for performing the stretch/relaxation process 81. In the tenter device 18, a stretch or a relaxation of the primary film 72 in predetermined directions is made, and then the primary film 72 is fed out as a produced polymer film (hereinafter polymer film) 82 from the tenter device 18. The polymer film 82 is wound up to a product film roll 84 in the second winding process 83.

Note that the melt-extrusion method of forming the primary film 72 is constructed of the raw material preparation process 71, the melt-extrusion process 73 and the cooling process 74.

(Polymers)

The polymers to be stretched in the manner above described is not restricted especially. For example, the preferable polymer is saturated norbornene and cellulose acylate. The saturated norbornene film and cellulose acylate film can have the adequate in-plane retardation (Re) and the adequate thickness retardation (Rth) by stretching, and is excellent in that the stretch unevenness hardly occurs.

(Cellulose Acylate Resin)

As for cellulose acylate to be used in this embodiment, it is preferable to satisfy all of following formulae (III)-(IV).

$$2.5 \leq A+B \leq 3.0 \quad \text{(III)}$$

$$1.25 \leq B \leq 3 \quad \text{(IV)}$$

In these formulae (I)-(II), A is the degree of substitution of the acetate groups for the hydrogen atoms on the hydroxyl groups of cellulose, and B is the total degree of substitution of the propionyl groups ($-CO-C_2H_5$), butyryl groups ($-CO-C_3H_7$), pentanoyl groups ($-CO-C_4H_9$) and hexanoyl groups ($-CO-C_5H_{11}$) for the hydrogen atoms on the hydroxyl groups of cellulose. According to the degree of substitution, if at least half of the substituted group according the total degree B is propionate group, the conditions is preferably $2.6 \leq A+B \leq 2.95$ and $2.0 \leq B \leq 2.95$, and particularly preferably $2.7 \leq A+B \leq 2.95$ and $2.4 \leq B \leq 2.9$. If less than half of the substituted group according the total degree B is propionyl group, the conditions is preferably $2.6 \leq A+B \leq 2.95$ and $1.3 \leq B \leq 2.5$, particularly preferably $2.7 \leq A+B \leq 2.95$ and $1.3 \leq B \leq 2.0$.

In the present invention, the degree of substitution of acetate group is made smaller, and the total degree of substitution of propionyl group, butyryl groups, pentanoyl groups and hexanoyl groups is made larger. Thus the stretch nonuniformity is prevented during the stretch, and the in-plane retardation Re and the thickness retardation Rth hardly becomes non-uniform. Furthermore, the crystal melting point Tm can be reduced. Further, the decomposition of the film formed by the melt-extrusion is reduced, and therefore it is prevented to change the film color to yellow. These effects can be obtained when the substitution degree becomes larger. However, the degree of substitution is too large, the glass transition temperature Tg and the coefficient of elasticity becomes smaller. Therefore, the substitution group is preferably propionyl group, butyryl groups, pentanoyl groups and hexanoyl group that are larger than acetyl group. The substitution group is particularly preferably propionyl group and butyryl group, and especially preferably butyryl group.

[Raw Material Preparation Process]

In the present invention, the cellulose acylate resin to be used as the raw material of the film may be particles. However, preferably, pellets of the cellulose acylate resin is obtained in the raw material preparation process 71. The moisture content in the raw material is preferably at most 1%, and particularly at most 0.5%, and then the raw material is fed into a hopper. If the grass transition temperature of the raw material is represented as Tg, the temperature of the hopper is preferably in the range of Tg−50° C. to Tg+30° C., particularly in the range of Tg−40° C. to Tg+10° C., and especially preferably in the range of Tg−40° C. to Tg. Thus the readsorption of moisture in the hoper is reduced, and therefore the effect of the drying becomes larger.

[Melt-Extrusion Process and Cooling Process]

In this embodiment, the melt-extrusion process 73 and the cooling process 74 is performed sequentially. In the melt-extrusion process 73, the CAP tips are supplied into the extruder which is heated under vacuum or in nitrogen gas, and the melt-extrusion is made by the manner already known. The extruder extrudes onto a cooled drum the melt CAP having a sheet like form. Thereafter, in the cooling process 74, the melt sheet is cooled on the cooled drum to make a solidification. Thus the primary film 72 is formed.

If a plurality of the extruder is used to make plural extrusions simultaneously, the produced film can have a multilayer structure. Furthermore, the additives (for example, matting agent) are extruded at the same time to be mixed into the primary film 72.

The explanation of the melt-extrusion process 73 will be made in detail in followings. The melting temperature of the CAP tips are preferably in the range of 120° C. to 250° C. particularly preferably 140° C. to 220° C., and especially preferably 150° C. to 200° C. The melting may be made at the constant temperature, and otherwise at predetermined several temperatures. The kneading time is preferably in the range of 2 minutes to 60 minutes, particularly preferably 3 minutes to 40 minutes, and especially preferably 4 minutes to 30 minutes. Further, it is also preferable to use the extruder in the airflow of inert gas (nitrogen and the like) or during the evacuation.

The melt resin (CAP) is fed by an extruder with a vent in accordance with driving a gear pump, and the pulsation of the extruder is reduced. Then the filtration of the melt CAP is made with use of the metallic meshed filter and the like. After the filtration, the melt CAP is cast from a T-type casting die onto the cooled drum so as to have the sheet-like form. The extrusion may be made so as to have a single layer. Otherwise, the casting die may have a feed block or plural manifolds, so as to make the extrusion of plural layer. The thickness unevenness in the widthwise direction can be controlled by adjusting the clearance of a lip of the casting die.

There are several methods of the extrusion, such as a method of electrostatic application, an air knife method, an air chamber method, a vacuum nozzle method, a touch roll method and the like. Preferably, the touch roll method is applied to the embodiment, such that the adherence of the molten CAP to the cooled drum may be larger. Such a method of increasing the adherence may be performed to whole or part of the molten CAP on the cooled drum. Note that the temperature of the cooled drum is preferably in the range of 60° C. to 150° C.

[First Winding Process]

In the first winding process 76, the primary film 72 is wound to the primary film roll 75. The primary film 72 is preferably in the range of 1.3 m to 3 m in width and 50 μm to 200 μm in thickness.

Before the winding, it is preferable to make a slitting of both edge side portions of the primary film 72. The slit portions are crushed. Then the necessary processing (such as pelletization, depolymerization, repolymerization and the like) is made. Thus the slit portions are processes to raw material which may be used for producing the same or other sort of the film. Further, before the winding, a laminate film may be applied to at least a surface of the primary film, in view of preventing the scratches on the film surface.

[Storing Process]

In the storing process 77, the primary film roll 75 is stored such that the polymer molecules of the primary film 72 may be not discomposed in effect of heat and moisture. Thus the optical properties and the quality of the primary film 72 are kept.

[Unwinding Process and Stretch/Relaxation Process]

In the unwinding process 80, the primary film 72 is unwound and fed to the tenter device 18. Then the stretch/relaxation process 21 is performed in the tenter device 18, in which the stretch in the widthwise direction and the relaxation in the longitudinal direction are made under the same conditions as the above description. When the extent percentage EP is less than 70%, the relaxation in the longitudinal direction of the primary film 72 is started. The objected stretch ratio R1 is preferably in the range of 10% to 40%, particularly 15% to 35%, and especially 25% to 30%. The relaxation ratio RL1 is preferably in the range of 1% to 5%, particularly preferably 2% to 5%, and especially preferably 3% to 5%. Note that the other conditions in the stretch/relaxation process 81 are preferably the same as the stretch/relaxation process 21.

Since the stretch in the widthwise direction and the relaxation in the longitudinal direction of the primary film 72 is made simultaneously, the polymer film 82 has a predetermined optical properties. According to the concrete optical properties of the polymer film 82, when the polymer film 82 is 60 μm to 120 μm in thickness, the in-plane retardation (Re) is in the range of 30 nm to 150 nm, and the thickness retardation (Rth) is in the range of 100 nm to 250 nm. However, the present invention is not restricted in it.

[Second Winding Process]

In the second winding process 83, the polymer film 82 is wound up around a winding shaft (not shown) to the product film roll 84.

[Experiment 1]

In followings, an experiment of the present invention will be explained. However, the present invention is not restricted in it. The explanation will be made in detail according to Example 1. In Example 2 and Examples 3-6 as Comparisons, the same explanations will be omitted as Example 1.

Example 1

| | |
|---|---|
| Cellulose Acetate Propionate (Powder: degree of acetylation, 1.00; degree of propionyl substitution, 1.70; degree of total substitution, 2.70; viscosity-average degree of polymerization, 260; water content, 0.2 mass %; viscosity of 6 mass % dichloromethane solution, 150 mPa · s; averaged particle diameter, 1.5 mm; standard deviation of averaged particle diameter, 0.4 mm) | 100 pts. wt. |
| Dichloromethane (first solvent compound) | 320 pts. wt. |
| Methanol (second solvent compound) | 83 pts. wt. |
| 1-butanol (third solvent comound) | 3 pts. wt. |
| Plasticizer A (trimphenyl phosphate) | 7.6 pts. wt. |
| Plasticizer B (diphenyl phosphate) | 3.8 pts. wt. |
| UV-absorbing agent A (2(2'-hydroxy-3',5'-di-tert-butyl-phenyl)benzotriazol) | 0.7 pts. wt. |
| UV-absorbing agent B (2(2'-hydroxy-3',5'-di-tert-amylphenyl)-5-chlorobenzotriazol) | 0.3 pts. wt. |
| Mixture of citric acid esters (Mixture of citric acid, citric acid monoethyl ester, citric acid diethyl ester, citric acid triethyl ester) | 0.006 pts. wt. |
| Particles (silicon dioxide particle diameter, 15 nm; Mohs Hardness, about 7) | 0.05 pts. wt. |

[Cellulosetriacetate]

According to cellulose triacetate propionate (CAP) used in this experiment, the content of remaining acetic acid was at most 0.1 mass %, the content of remaining propionic acid was at most 0.1 mass %, the Ca content was 60 ppm, the Mg content was 10 ppm, the Fe content was 0.2 ppm, and the sulfur content in sulfuric group was 65 ppm. The degree of acetylation at $6^{th}$ position was 0.32, the degree of substitution of propionyl group at $6^{th}$ position was 0.58, and the percentage of acetyl groups at $6^{th}$ position to the total acetyl groups was 33%. The methanol extract was 5 wt. %, and a ratio of weight-average molecular weight to number-average molecular weight was 2.5. Further, yellow index was 1.3, haze was 0.08, and transparency was 92.9%. Tg (measured by DSC) was 133° C., and calorific value in crystallization was 6.4 J/g. This CAP is synthesized from cellulose as material obtained from broad leaf tree.

The casting dope 11 was prepared in the dope preparation process 10. The mixing tank had first and second stirrers and was made of stainless and 4000 L in volume. Into the mixing tank, plural solvent compounds were mixed such that a mixture solvent was obtained. Note that the water content in each solvent compound is at most 0.5 mass %. The stirring was made with use of the first stirrer having the anchor blade and the second stirrer which was eccentric stirrer of dissolver type. At first, the first stirrer performed the stirring at one m/sec as circumferential velocity. Thus the dispersion was made for 30 minutes during the stirring. The dissolving started at 25° C., and the temperature of the dispersion became 48° C. at last. While the stirring of the mixture solvent was made, the cellulose triacetate flakes were added from the hopper to the mixture solvent gradually, such that the total mass of the mixture solution and the cellulose triacetate flakes might be 2000 kg. After the dispersion, the high speed stirring (of the second stirrer) was stopped, and the stirring was performed by the first stirrer at 0.5 m/sec as circumferential velocity for 100 minutes. Thus CAP flakes was swollen such that the mixture liquid was obtained. Until the end of the swelling, the inner pressure of the mixing tank was increased to 0.12 MPa with use of nitrogen gas. At this moment, the hydrogen concentration in the mixing tank was less than 2 vol. %, which does not cause the explosion. Further, water content in the dope was 0.3 mass %.

The mixture liquid was fed by the pump to the heating device which is the tube with the jacket, and heated to 50° C., and thereafter heated under the application of pressure at 2 MPa to 90° C. Thus the dissolving was made completely. The heating time was 15 minutes. The temperature of the mixture liquid is decreased to 36° C. by the temperature controller, and then filtrated through the filtration device having filtration material whose nominal diameter was 8 μm. At this moment, the upstream side filtration pressure was 1.5 MPa, and the downstream side filtration pressure was 1.2 MPa. Since the filter, the housing and the pipes were made of hastelloy alloy (trade name) and had jacket for using at high temperature, they were made from materials excellent in corrosion resistance.

The dope was fed into the flushing device whose pressure was kept to the atmospheric pressure at 80° C., such that the flush evaporation of the dope was made. The solvent vapor was condensed by the condenser to the liquid state, and recovered by the recovering device. After the flushing, the content of solid compounds in the dope was 21.8 mass %. Note that the recovered solvent was refined and recycled by the refining device and reused. The anchor blade is provided at a center shaft of a flush tank of the flushing device, and the dope was stirred by the anchor blade at 0.5 m/sec as circumferential velocity. The temperature of the dope in the flush tank was 25° C., the retaining period of the dope in the flush tank was 50 minutes. Part of the dope was sampled, and the measurement of the shearing viscosity was made at 25° C. The shearing viscosity was 450 Pa·s at 10 (1/s) of shearing rate.

Then the defoaming was further made by irradiating very weak ultrasonic waves. Thereafter, the dope was fed to the filtration device 31 by the pump under the application of pressure at 1.5 MPa. In the filtration device, the dope was fed at first through a sintered fiber metal filter whose nominal diameter was 10 μm, and then through the same filter of 10 μm nominal diameter. At the forward and latter filters, the upstream pressures were respectively 1.5 MPa and 1.2 MPa, and the downstream pressures were respectively 1.0 MPa and 0.8 MPa. The temperature of the dope after the filtration was controlled to 36° C., and stored as the casting dope 11 in the stainless stock tank 25 whose volume was 2000 L. The anchor blade is provided to a center shaft of the stock tank 25, and the casting dope 11 was always stirred by the anchor blade at 0.3 m/sec as circumferential velocity. Note that when the concentrating of the dope is made, corrosions of parts or portions contacting to the dope in the devices didn't occur at all.

Further, the mixture solvent A for preparing the additive liquid contained dichloromethane of 86.5 pts. wt., acetone 13 pts. wt., and 1-butanol 0.5 pts. wt.

The primary film 14 was formed in the film production apparatus 4 shown in FIG. 2. The casting dope 11 in the stock tank 25 was fed to the filtration device 32 by the pump 38. The pump 38 for increasing the upstream pressures was high accuracy gear pumps and driven to feed the casting dope 11 while the feed back control was made by an inverter motor. Thus the upstream pressure of high accuracy gear pump was controlled to 0.8 MPa. As for the pump 38, volumetric efficiency was 99.2%, and the variation rate of the discharging was at most 0.5%. Further, the discharging pressure was 1.5 MPa.

The width of the casting die 33 was 1.8 m, The flow rate of the casting dope 11 near a die lip of the casting die 33 is controlled such that the primary film may be 80 μm in thickness. The casting width of the casting dope 11 from the die lip was 1700 mm. Further, in order to control the temperature of the casting dope 11 to 36° C., the temperature of the heat transfer medium at an entrance of a jacket (not shown) was 36° C.

The temperature of the casting die 33 and pipes was kept to 36° C. in the film production. The casting die 33 was the coat hunger type, in which heat bolts for adjusting the film thickness were disposed at the pitch of 20 mm. Thus the film thickness (or the thickness of the casting dope) is automatically controlled by the heat bolt. A profile of the heat volt can be set corresponding to the flow rate of the high accuracy gear pump, on the basis of the preset program. Thus the feed back control can be made by the control program on the basis of the profile of an infrared ray thickness meter (not shown) disposed in the film production apparatus 4. The control was made such that, with exception of both side edge portions (20 mm each in the widthwise direction of the produced film), the difference of the film thickness between two positions which were 50 mm far from each other might be at most 1 μm, and the largest difference between the minimal values of the film thickness in the widthwise direction might be at most 3 μm/m. Further, the average film thickness might was controlled in ±1.5%.

The material of the casting die 33 was the precipitation hardening stainless steel, whose coefficient of thermal expansion was at most $2 \times 10^{-5}$ (° C.$^{-1}$). In the compulsory corrosion experiment in an electrolyte solution, the corrosion resistance was almost the same as that of SUS316. Further, the material to be used for the casting die 33 had enough corrosion resistance, such that the pitting (or pitting corrosion) might not occur on the gas-liquid interface even if this material were dipped in a mixture liquid of dichloromethane, methanol and water for three months. The finish accuracy of the contact surface of each casting die to the casting dope 11 was at most 1 μm in surface roughness, straightness in any direction was at most 1 μm in surface roughness, and the slit clearance of the die lip was adjusted to 1.5 mm. According to an edge of the contact portion of a lip end of the casting die 33, R is at most 50 μm in all of a width. Further, the shearing rate in the casting die 33 controlled in the range of one to 5000 per second. Further, the WC coating was made on the lip end from the casting die 33 by a melt extrusion method, so as to provide the hardened layer.

In order to prevent the dry and solidification on part of the slit end of the casting die 33, the mixture solvent A dissolvable of the solidified dope was supplied to each edge portion of the gas-liquid interface of the slit at 0.5 ml/min. Thus the mixture solvent is supplied to each bead edge. The pulse rate of a pump for supplying the mixture solvent was at most 5%. Further, the decompression chamber 33a was provided for decreasing the pressure in the rear side by 150 Pa. In order to control the temperature of the decompression chamber 33a, a jacket (not shown) was provided, and a heat transfer medium whose temperature was controlled at 35° C. was supplied into the jacket. The edge suction rate could be controlled in the range of 1 L/min to 100 L/min, and was adequately controlled in this experiment so as to be in the range of 30 L/min to 40 L/min.

The casting belt 35 was an endless stainless belt which was 2.1 m in width and 70 m in length. The thickness of the casting belt 35 was 1.5 mm, and the surface of the casting belt 35 was polished, such that the surface roughness might be at most 0.05 μm. The material was SUS316, which had enough corrosion resistance and strength. The thickness unevenness of the entire casting belt 35 was at most 0.5% of the predetermined value. The casting belt 35 was moved by rotating the back-up rollers 35a, 35b. At this moment, the tension of the casting belt 35 was controlled to $1.5 \times 10^5$ N/m$^2$. Further, the relative speed to each roller to the casting belt 35 changed. However, in this experiment, the control was made such that the difference of the relative speed between the back-up rollers 35a, 35b was at most 0.01 m/min. Further the control was made such that the variation of the speed of the casting belt 35 was at most 0.5% to the predetermined value. The position of the casting belt 35 in the widthwise direction was controlled with detection of the position of the side end, such that meandering of the casting belt 35 running for one circle was reduced in 1.5 mm. Further, below the casting die 33, the variation of the position in the vertical direction between the lip end of the casting die 33 and the casting belt 35 was in 200 μm. The casting belt 35 is preferably incorporated in the casting chamber 39 which has air pressure controller (not shown). The casting dope was cast onto the casting belt 35 from the casting die 33.

In this experiment, the back-up rollers 35a, 35b were supplied therein with a heat transfer medium, such that the temperature of the casting belt 35 might be controlled. The back-up roller 35a disposed in a side of the casting die 33 was supplied with the heat transfer medium (water) at 5° C., and the back-up roller 35b was supplied with the heat transfer medium (water) at 40° C. The surface temperature of the middle portion of the casting belt 35 at a position just before the casting was 15° C., and the temperature difference between both sides of the casting belt 35 was at most 6° C. Note that a number of pinhole (diameter, at least 30 μm) was zero, a number of pinhole (diameter, 10 μm to 30 μm) was at most one in square meter, and a number of pinhole (diameter, less than 10 μm) was at most two in square meter.

The temperature of the casting chamber 39 was kept to 35° C. At first, the drying air was fed out in parallel to the casting film 34 so as to make the drying. The overall heat transfer coefficient from the drying air to the casting film 34 was 24 kcal/(m$^2$·hr·° C.). Further, the drying air at 135° C. was fed out from the upstream air duct 70 to dry the casting film 34, the drying air at 140° C. was fed out from the downstream air duct 71 to dry the casting film 34, and the drying air at 65° C. was fed out from the lower air duct 72 to dry the casting film 34. The saturation temperature of each drying air was about −8° C. Note that the oxygen concentration in the drying atmosphere on the casting belt 35 was kept to 5 vol % by substituting the air for nitrogen gas. In order to keep the oxygen concentration to 5 vol %, the inner air of the drying atmosphere was substituted by nitrogen gas. The solvent vapor in the casting chamber 39 was recovered by setting the temperature of exit of the condenser 66 to −10° C.

The air shielding plate 33b was disposed such that the drying air might not be applied to the casting film 34 and the bead directly for 5 seconds after the casting. The stationary fluctuation near the casting die 33 was reduced to at most ±1 Pa. when the mass ratio of the solvent to the casting film 34 became 50 mass % on dry basis, the casting film 34 was peeled as the primary film 14 from the casting belt 35 with support of the peel roller 37. If the sample weight of the casting film 34 was x and the sample weight after the drying was y, the solvent content on the dry basis (%) was calculated in the formula, $\{(x-y)/y\} \times 100$. Note that in the content of the remaining solvent on dry basis, the weight of the solid obtained by completely drying the dope corresponds to 100%. Further, the peeling tension was $1 \times 10^2$ N/m$^2$. In order to reduce the peeling defects, the percentage of the peeling speed (the draw of the peel roller) to the speed of the casting belt 35 was controlled from 100.1% to 110%. The surface temperature of the primary film 14 was 15° C. The drying speed on the casting belt 35 was 60 mass %/min in average on dry basis. The solvent vapor generated in the evaporation is condensed by the condenser 66 at −10° C. to a liquid state, and recovered by the recovering device. The water content of the recovered solvent was adjusted to at most 0.5%.

The air from which the solvent components were removed was heated again and reused for the drying air. The primary film 14 was transported with the rollers in the transfer area 80. In the transfer area 80, the air blower 81 fed the drying air at 40° C. to the primary film 14. Note that the tension about 30N was applied to the primary film 14 in the longitudinal direction of the rollers in the transfer area 80. Further, at the most downstream position of the transfer area 40, the content of the remaining solvent in the wet film 36 was 20 mass % on the dry basis.

Before fed into the drying chamber 44, both side edge portions of the wet film 36 were slit off by the edge slitting device 42. The cutter provided in the edge slitting device 42 was a NT type cutter. After the slitting, the slit portions were fed to the crusher 90 by a cutter blower (not shown) and crushed into tips about 80 mm$^2$ in average. The tips were used as raw materials of the dope preparation, with CAP flakes. Further, between the edge slitting device 42 and the drying chamber 44, there was a predrying chamber (not shown) in which the drying air at 100° C. was blown to the wet film 36 for the pre-drying.

Then the wet film 36 was dried at high temperature in the drying chamber 44, which was partitioned into four partitions. Air blows whose temperatures were 120° C., 130° C., 130° C. and 130° C. from the upstream side were fed from air blowers (not shown) to the partitions. The transporting tension of each roller 44a to the wet film 36 was 100 N/m. The drying was made for ten minutes such that the content of the remaining solvent might be 0.3 mass %. The lapping angle (center angle of contacting arc) of the roller 4 was 90° and 180°. The rollers 44a were made of aluminum or carbon steel. On the surface, the hard chrome coating was made. The surfaces of the rollers 44a were flat or processed by blast of matting process. The swing of the roller in the rotation was in 50 μm. Further, the bending of the roller 44a at the tension of 100N/m was reduced to at most 0.5 mm.

The solvent vapor contained in the drying air is removed with use of the recovering device 44b in which an adsorbing agent was used. The adsorbing agent was active carbon, and the desorption was performed with use of dried nitrogen. The recovered solvent was reuse as the solvent for the dope preparation after the water content might be at most 0.3 mass %. The drying air contains not only the solvent vapor but also gasses of the plasticizer, UV-absorbing agent, and materials of high boiling points. Therefore, a cooler for removing by cooling and a preadsorber were used to remove them. Thus the drying air was reused. The ad- and desorption condition was set such that a content of VOC (volatile organic compound) in exhaust gas might be at most 10 ppm. Furthermore, in the entire solvent vapor, the solvent content to be recovered by condensation method was 90 mass %, and almost of the remaining solvent vapor was recovered by the adsorption recovering.

The wet film 36 was transported to a first moisture controlling chamber (not shown). In the interval section between the drying chamber 44 and the first moisture controlling chamber, the drying air at 110° C. was fed. In the first moisture controlling chamber, the air whose temperature was 50° C. and dewing point was 20° C. was fed. Further, the wet film 36 was fed into a second moisture chamber (not shown) in which the curling of the wet film 36 was reduced. An air whose temperature was 90° C. and humidity was 70% was applied to the wet film 36 in the second moisture controlling chamber.

After the moisture adjustment, the wet film 36 was cooled to 30° C. in the cooling chamber 45, and fed out as the primary film 14. Then the edge slitting was performed by an edge slitting device (not shown). The compulsory neutralization device (or a neutralization bar) 50 was provided, such that in the transportation, the charged electrostatic potential of the primary film 14 might be in the range of −3 kV to +3 kV. Further, the film knurling was made on a surface of each side of the primary film 14 by the knurling roller 51. The width of the knurling was 10 mm, and the knurling pressure was set such that the maximal thickness might be at most 12 μm larger in average than the averaged thickness.

The primary film 14 was transported to the winding chamber 52, whose inside temperature and humidity were respectively kept to 28° C. and 70%. Further, a compulsory neutralization device (not shown) was provided, such that the charged electrostatic potential of the film might be in the range of −1.5 kV to +1.5 kV. The obtained primary film 14 was 80 μm in thick and 1475 mm in width. The diameter of the winding shaft 52a was 169 mm. The tension pattern was set such that the winding tension was 300 N/m at first, and 200 N/m at last. The primary film 14 was entirely 3940 m in length. The meandering cycle in the winding was 400 m, and the oscillation width was in ±5 mm. Further, the pressure of the press roller 96 to the winding shaft 52a was set to 50 N/width. The temperature of the film at the winding was 25° C., the water content was 1.4 mass %, and the content of the remaining solvent was 0.3 mass %. Through all processes, according to the drying speed, 20 mass % of the solvent in dry weight standard was evaporated per minute in average. Further, the loose winding and wrinkles didn't occur, and the film didn't transit in the film roll even in 10 G impact test. Further, the roll appearance was good.

The primary film roll 16 was stored under the condition at 25° C. and 55% RH for one month. Furthermore, as result of inspecting in the same manner as above, the change having influence of the film quantity was not recognized. Furthermore there was any adhesion in the film roll. Further, after the primary film 14 was produced, part of the casting film 34 didn't remain on the casting belt 35 after the peeling.

Then the primary film 14 is unwound in the unwinding process 20, and fed to the tenter device 18 in FIG. 3. The feeding speed is 50 m/min. Then the stretching was performed in the stretch/relaxation process 21. Both side edges of the primary film 14 fed to the tenter device 18 was held by clips and fed in the tenter device 18. The clips were cooled with use of a heat transfer medium (not shown). The transport of the clips was made by a chain, and the speed fluctuation of the clip transportation was at most 0.5%.

In the tenter device 18, the stretch of the primary film 14 in the widthwise direction and the relaxation in the longitudinal direction were made. According to the distance of the clip pair, the minimum L1 (mm) was 1000 mm, the maximum L2 (mm) was 1250 mm. Therefore, the objected stretch ratio R1 was 25%. Further, the final value L3 (mm) of the distance of the clip pair was 1200 mm. When the distance was L1' (1050 mm), the relaxation in the longitudinal direction was started. When the relaxation in the longitudinal is completed at 2% of the relaxation ratio, the distance L1" (mm) was 1170 mm.

According to the stretching ratio in the tenter device 18, the difference of the actual stretching ratio was at most 10% between positions which were at least 10 mm apart from the holding positions of the clips, and at most 5% between positions which were 20 mm apart from the holding portions. In the side edge portions in the tenter device 18, the ratio of the length between the clip starting position and the clip releasing position to that between the entrance 18a and the exit 18b was 90%.

The primary film 14 is fed out as the produced polymer film 22, and then the second winding process 23 was performed. The polymer film 22 is wound up around the winding shaft to the product film roll 24. In this case, in order to prevent the winding defect (such as winding irregularity and the like), the press roller 52b was used to press at 50 Pa the polymer film 22 toward the winding shaft 52a.

[Estimation]

(Measurement of In-plane Retardation (Re))

The primary film 14 was cut to 70 mm by 100 mm to obtain sample films. Then the sample films were disposed at 25° C. and 60% RH of humidity for two hours, and the extrapolation values of the refractive index were measured according to the perpendicular direction to the sample film with use of 632.8 nm visible ray by an automatic birefringence meter (KOBRA21DH, produced by Oji Scientific Instruments). On the base of the result, the in-plane retardation was calculated from the following formula:

$$Re = |nMD - nTD| \times d \quad (2)$$

Note that "nMD" and "nTD" were refractive indexes in the longitudinal and widthwise directions of the primary film 14 respectively. "d" was an average thickness (nm) of the sample film. According to this formula, the in-plane retardation (Re) of the primary film 14 was 82 nm.

(Measurement of Thickness Retardation (Rth))

The primary film 14 was cut to 30 mm by 40 mm to obtain sample films. Then the sample films were disposed at 25° C. and 60% RH of humidity for two hours. With use of an elipsometer (M150, produced by Jasco Corporation), the values of the refractive index was measured according to the perpendicular direction to the sample film, and the extrapolation values of the refractive index were measured with inclining the sample films. The wavelength of the ray used for the measurement was 632.8 nm. On the base of the result, the thickness retardation was calculated from the following formula:

$$Rth = \{(nMD + nTD)/2 - nTH\} \times d \quad (1)$$

Note that "nMD", "nTD" and "nTH" were refractive indexes in the longitudinal (casting), widthwise, and thickness directions of the sample film respectively. "d" was an average thickness (nm) of the sample film. According to this formula, the thickness retardation (Rth) of the primary film 14 was 192 nm.

Example 2

In Experiment 2, the objective stretch ratio R1 in the widthwise direction was 15%. When the extent percentage was 40%, the relaxation in the longitudinal direction was started. When the relaxation ratio becomes 2%, the relaxation was completed. Other conditions were the same as Experiment 1. The obtained data was used for calculating the in-plane retardation Re and the thickness retardation Rth, which were respectively 60 nm and 174 nm.

Comparisons

Examples 3-6

In Comparisons, the objective stretch ratio was 30% in Example 3, 25% in Example 4, 15% in Example 5, and 35% in Example 6. The relaxation in the longitudinal direction was not made in Examples 3-6. Other conditions were the same as Example 1. The obtained data was used for calculating the in-plane retardation Re and the thickness retardation Rth. In Example 3, the values Re and Rth were respectively 80 nm and 202 nm. In Example 4, the values Re and Rth were respectively 70 nm and 194 nm. In Example 5, the values Re and Rth were respectively 50 nm and 175 nm. In Example 6, the values Re and Rth were respectively 85 nm and 205 nm.

Figure 5:
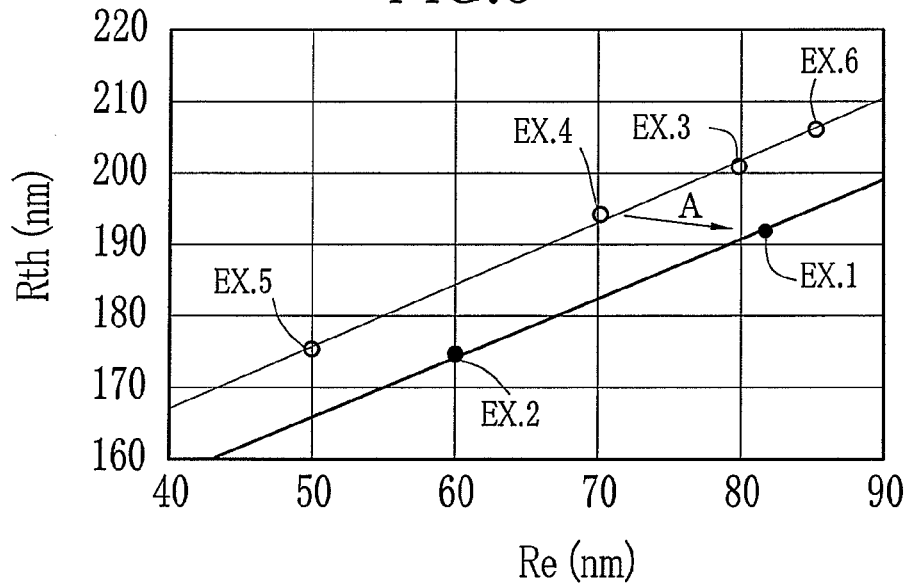
FIG. 5 is a graph of a relation between an in-plane retardation Re and a thickness retardation Rth of each film in Examples 1-6.

On the basis of the results of Examples 1-2 (with the relaxation during the stretch) and Examples 3-6 (without the relaxation during the stretch), a correlation between the in-plane retardation Re and the thickness retardation Rth is shown in FIG. 4, and a correlation between the objective stretch ratio and a retardation ratio (Re/Rth) is shown in FIG. 5.

As shown in FIG. 5, at the same value of the thickness retardation Rth, the in-plane retardation of the line of Examples 1-2 is lower than that of Examples 3-6. Especially, in Example 4, the relaxation in the longitudinal direction was not made during the stretch in the widthwise direction, and other conditions were the same as Example 1. In comparison of Example 1 to Example 4, as shown with arrow A, if the relaxation in the longitudinal direction is made during the stretch in the widthwise direction, the in-plane retardation Re increased and the thickness retardation Rth decreased.

As shown in FIG. 5, if the relaxation is not made during the stretch, the objected stretch ratio R1 must be 35% of Example 6 in order to obtain the same value Re/Rth as Example 1. However, in Example 6, the transparency of the film became bad. Therefore, as shown by an arrow B, the relaxation in the longitudinal direction during the stretch in the widthwise direction increases the retardation ratio (Re/Rth) even if the objected stretch ratio R1 is low. Further, as shown in an arrow C, the relaxation during the stretch increases the retardation ratio Re/Rth.

Figure 6:
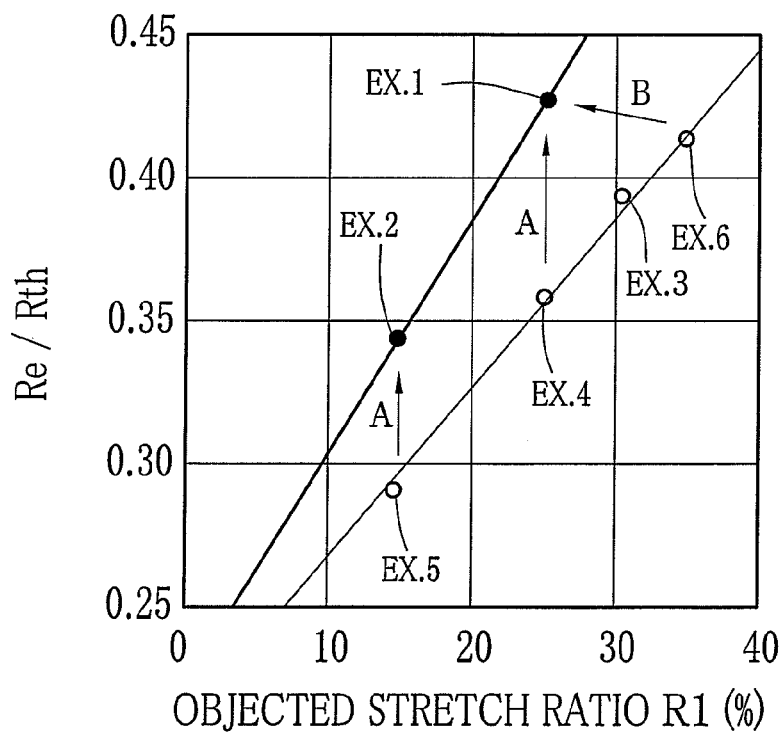
FIG. 6 is a graph of a relation between a stretch ratio R1 in a widthwise direction of each film in Examples 1-6 and a retardation ratio of Re/Rth.

In FIG. 6, Example 1 and Example 2 are respectively compared to Example 4 and Example 5. If the relaxation in the longitudinal direction is made during the stretching in the widthwise direction, the retardation ratio (Re/Rth) of the produced polymer film 22 is increased. (see, arrow A of FIG.

If the stretching of the film is made at the high stretch ratio, the transparency of the film sometimes becomes lower, and in this case, the film cannot be used for a display. However, in the present invention, the relaxation in the longitudinal direction is made during the stretch in the widthwise direction. As the result, even if the stretch ratio is low, the in-plane retardation Re increases and the thickness retardation Rth decrease, so as to be preferable without decrease of the transparency of the film.

Various changes and modifications are possible in the present invention and may be understood to be within the present invention.

The invention claimed is:

1. A method of producing a polymer film comprising the steps of:
    casting a dope comprising a polymer and a solvent from a die onto a support so as to form a casting film;
    peeling said casting film as a wet film from said support;
    drying said wet film so as to obtain a polymer film;
    winding said polymer film to a film roll;
    unwinding said polymer film from said film roll;
    stretching said polymer film in a widthwise direction thereof;
    performing during the stretch a relaxation of said polymer film in a longitudinal direction thereof; and
    wherein the relaxation of said polymer film in a longitudinal direction is initiated when the stretching of said polymer film in a widthwise direction is 40% or more and less than 70% of the final stretch ratio; and
    wherein the length of said polymer film in the longitudinal direction after the stretch is shorter than that before the stretch.

2. The method of claim 1, wherein a relaxation ratio of said polymer film by the relaxation is in the range of 1% to 5%.

3. The method of claim 2 wherein the relaxation ratio is relative to the longitudinal direction.

4. The method of claim 1, wherein a stretch ratio of the stretch is in the range of 10% to 40%.

5. The method of claim 1, wherein said polymer is one of cellulose triacetate, cellulose acetate propionate, and cellulose acetate butylate.

6. The method of claim 5, wherein an in-plane retardation Re of said polymer film after the stretch is in the range of 5 nm to 150 nm and a thickness retardation Rth is in the range of 40 nm to 250 nm.

7. The method of claim 1, further comprising verifying said polymer film after the stretching is usable for an optical functional film.

8. A method of producing a polymer film comprising steps of:
    forming said polymer film from a polymer by melt-extrusion;
    winding said polymer film to a film roll;
    unwinding said polymer film from said film roll;
    stretching said polymer film in a widthwise direction thereof; and
    performing during the stretch a relaxation of said polymer film in a longitudinal direction thereof; and
    wherein the relaxation of said polymer film in a longitudinal direction is initiated when the stretching of said polymer film in a widthwise direction is 40% or more and less than 70% of the final stretch ratio; and
    wherein the length of said polymer film in the longitudinal direction after the stretch is shorter than that before the stretch.

9. The method of claim 8, wherein a relaxation ratio of said polymer film by the relaxation is in the range of 1% to 5%.

10. The method of claim 9 wherein the relaxation ratio is relative to the longitudinal direction.

11. The method of claim 8, wherein a stretch ratio of the stretch is in the range of 10% to 40%.

12. The method of claim 8, wherein said polymer is one of cellulose triacetate, cellulose acetate propionate, and cellulose acetate butylate.

13. The method of claim 12, wherein an in-plane retardation Re of said polymer film after the stretch is in the range of 5 nm to 150 nm and a thickness retardation Rth is in the range of 40 nm to 250 nm.

14. The method of claim 8, further comprising verifying said polymer film after the stretching is usable for an optical functional film.

* * * * *